(12) United States Patent
Alex et al.

(10) Patent No.: US 8,855,250 B2
(45) Date of Patent: Oct. 7, 2014

(54) WIRELESS COMMUNICATION SYSTEM WITH IMPROVED AUTOMATIC GAIN CONTROL

(75) Inventors: Sam Alex, Bangalore (IN); Rajesh Manakkal, Bangalore (IN); Shashidhar Vummintala, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 130 days.

(21) Appl. No.: 13/252,047

(22) Filed: Oct. 3, 2011

(65) Prior Publication Data

US 2013/0083831 A1   Apr. 4, 2013

(51) Int. Cl.
H04B 14/06 (2006.01)
H04W 52/52 (2009.01)

(52) U.S. Cl.
CPC .................................... *H04W 52/52* (2013.01)
USPC .......................................... 375/345; 455/130

(58) Field of Classification Search
None
See application file for complete search history.

(56) References Cited

U.S. PATENT DOCUMENTS

| | | | |
|---|---|---|---|
| 6,324,387 B1 * | 11/2001 | Kamgar et al. | 455/234.1 |
| 6,452,964 B1 * | 9/2002 | Yoshida | 375/222 |
| 6,931,050 B1 * | 8/2005 | Bottomley | 375/130 |
| 7,554,937 B2 * | 6/2009 | Lim et al. | 370/316 |
| 7,593,705 B2 * | 9/2009 | Sato et al. | 455/234.1 |
| 2003/0058951 A1 * | 3/2003 | Thomson et al. | 375/260 |
| 2004/0100941 A1 * | 5/2004 | Lim et al. | 370/349 |
| 2005/0002478 A1 * | 1/2005 | Agami et al. | 375/345 |
| 2006/0068828 A1 * | 3/2006 | Eckl | 455/522 |
| 2009/0016420 A1 * | 1/2009 | Kwak et al. | 375/227 |
| 2009/0325586 A1 * | 12/2009 | Shen et al. | 455/450 |
| 2010/0023836 A1 * | 1/2010 | Miyoshi et al. | 714/751 |
| 2011/0007646 A1 * | 1/2011 | Miller et al. | 370/252 |
| 2012/0170684 A1 * | 7/2012 | Yim et al. | 375/316 |

* cited by examiner

*Primary Examiner* — Santiago Garcia
(74) *Attorney, Agent, or Firm* — Sterne, Kessler, Goldstein & Fox PLLC

(57) ABSTRACT

A wireless communication device is disclosed that includes an automatic gain controller capable of accurately adjusting gain of a received signal. The received signal includes a plurality of symbols, including pilot symbols that each includes at least one pilot tone, and data symbols that do not include any pilot tones. A power of a pilot symbol is determined, and a power of a data symbol is determined. The determined data symbol power is then scaled by a scaling factor (that depends on various system parameters) and is subtracted from the determined pilot symbol power to provide an estimate of a power of the pilot tones within the signal. From the estimated pilot tone power, the automatic gain controller can accurately determine a preferred gain for amplifying future frames of the received signal.

22 Claims, 5 Drawing Sheets

WIRELESS COMMUNICATION SYSTEM WITH IMPROVED AUTOMATIC GAIN CONTROL

BACKGROUND

1. Field of Invention

The invention relates to wireless communications, and more specifically to automatic gain control performed within a wireless communication device that adjusts gain independent of frame loading.

2. Related Art

Wireless communication devices, such as cellular telephones to provide an example, are becoming commonplace in both personal and commercial settings. The wireless communication devices provide users with access to all kinds of information. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency modulated with encoded information. This radio frequency is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including amplitude modulation (AM), frequency modulation (FM), quadrature amplitude modulation (QAM), phase shift keying (PSK), quadrature phase shift keying (QPSK), and/or orthogonal frequency-division multiplexing, as well as any other communication scheme that is now, or will be, known.

For most modulation schemes, devices employ a technique known as automatic gain control (AGC) in order to normalize the power/strength of all received signals to a particular level. In other words, signals received from a wireless communication environment will have varying levels of power due to channel conditions, such as noise, distance, Doppler Effect, interference, etc. Thus, simply demodulating and outputting the received signals will produce audible volume fluctuations, or other signal distortions, and can result in processing errors and/or low signal-to-quantization noise ratio (SQNR). Thus, AGC is used to reduce high-power signals and/or increase low-power signals to be within a particular range.

Typical AGC adjusts gain by determining a symbol in a received signal with a highest energy and adjusting the gain to bring the symbol within a certain dynamic range. Although this method is generally able to track variations in received power due to varying channel conditions, many other unpredictable factors also affect the tracking, for which typical AGC is unable to compensate.

As another example, in an OFDM communication system, the AGC sets the gain for a future frame based on a most-energetic symbol within a current frame. However, the AGC does not compensate for the frame loading of consecutive OFDM sub-frames, which may cause over and/or under-compensations. Frame loading refers to how many sub-carriers within an OFDM sub-frame are allocated and the power of each of those sub-carriers. When the AGC receives a very heavy-loaded frame (meaning that most sub-carriers are loaded and/or with high power), the AGC will back off gain to compensate. However, since the AGC does not know the frame loading it backs off assuming the worst case scenario of no loading. Often, however, the following frame is not as highly-loaded. Thus, the gain has been overcompensated for the following frame, which may result in processing errors or poor signal outputs.

Thus, there is a need for a wireless communication device that can effectively analyze received signals and adjust signal gain, while accounting for additional data variations that may appear to be channel variations to an AGC, such as frame loading. Further aspects and advantages of the invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 3A:
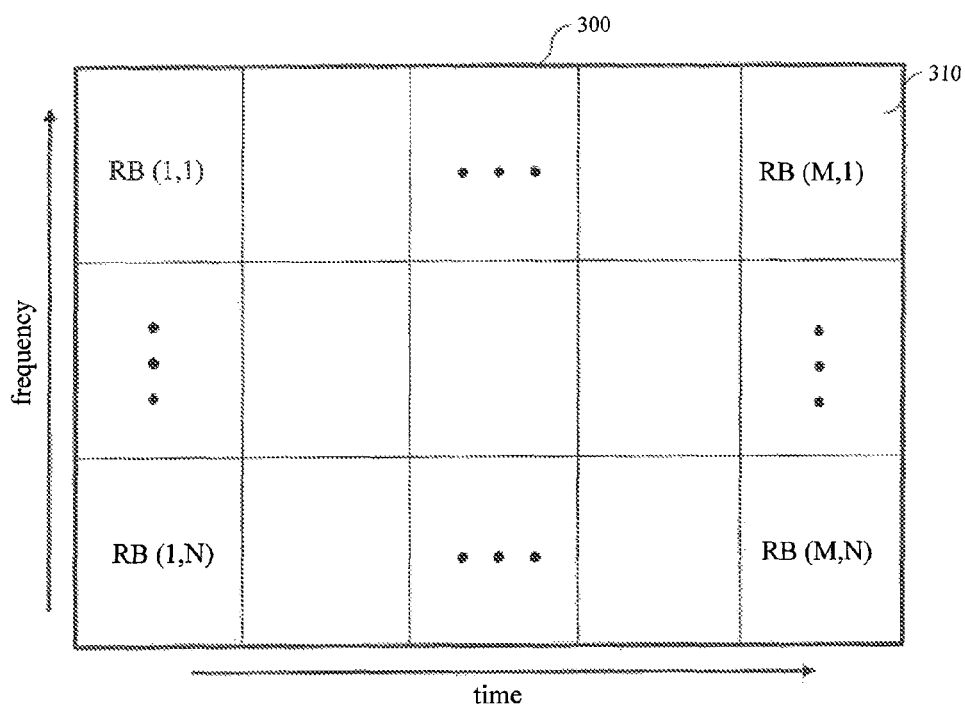
Figure 3B:
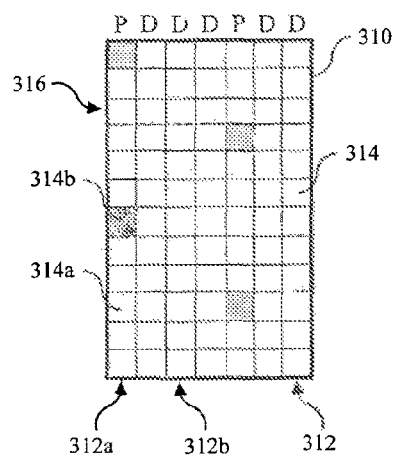
Figure 4:
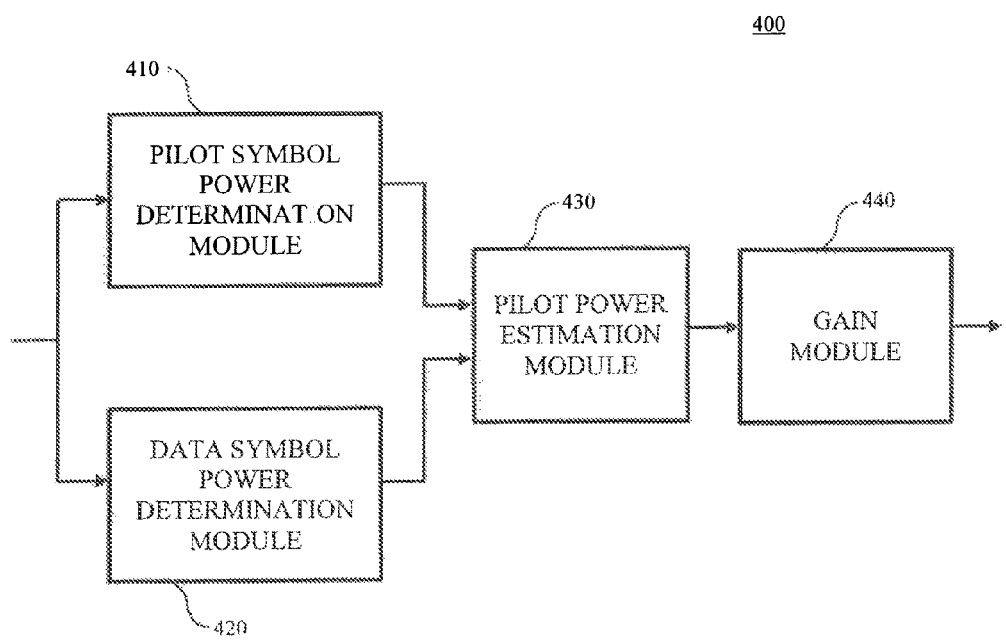
Figure 5:
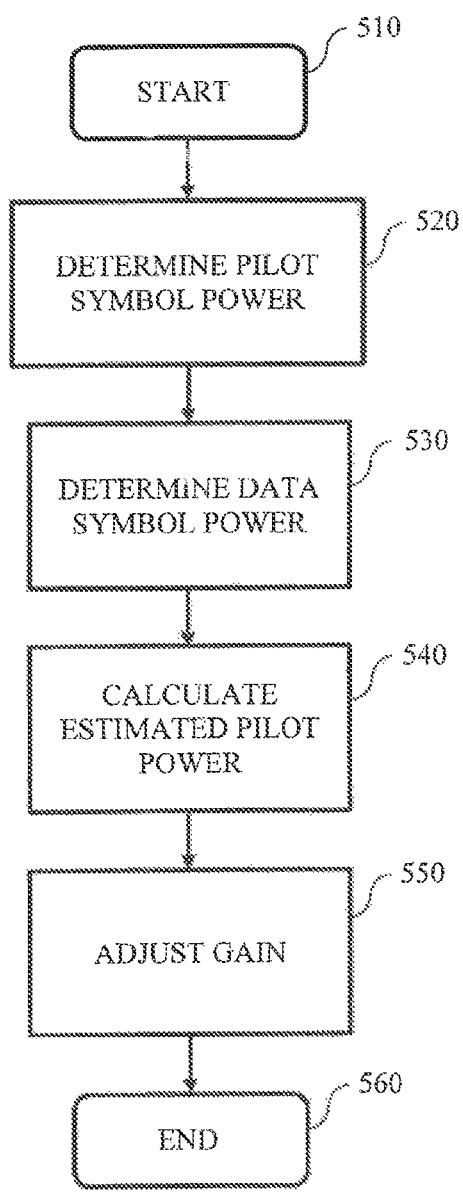

FIG. 3A graphically illustrates a communication sub-frame in accordance with a modulation scheme that may be implemented by the first wireless communication device according to an exemplary embodiment of the invention;

FIG. 3B graphically illustrates a resource block that may be implemented within the communication sub-frame according to an exemplary embodiment of the invention;

FIG. 4 illustrates a block diagram of a measurement module that is implemented as part of the wireless communication device according to an exemplary embodiment of the invention; and FIG. 5 illustrates a block diagram of a method for adjusting the gain of a received wireless signal in a wireless communication device according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment.

Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is to be described in terms of wireless communication (specifically cellular communication), those skilled in the relevant art(s) will recognize that the present invention may be applicable to other communications that use wired or other wireless communication methods without departing from the spirit and scope of the present invention.

An Exemplary Wireless Communications Environment

Figure 1:
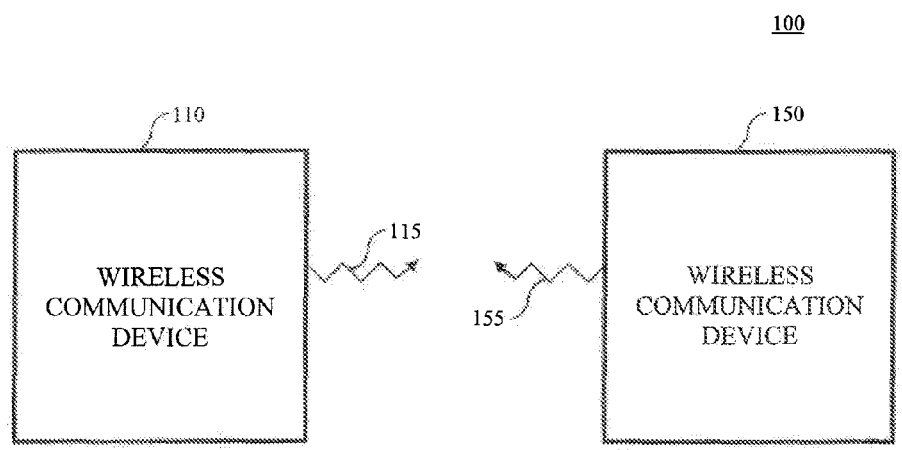
FIG. 1 illustrates a block diagram of a wireless communication environment according to an exemplary embodiment of the invention.

FIG. 1 illustrates a block diagram of a wireless communication environment 100 according to an exemplary embodiment of the invention. The wireless communication environment 100 provides wireless communication of information, such as one or more commands and/or data, between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the invention.

The exemplary wireless communication environment 100 includes a first wireless communication device 110 and a second wireless communication device 150. The first wireless communication device 110 may represent an exemplary embodiment of a mobile subscriber and the second wireless communication device 150 may represent an exemplary embodiment of a base station within a cellular communications network.

The second wireless communication device 150 transmits a second wireless signal 155 toward the first wireless communication device 110 using any acceptable modulation scheme. The first wireless communication device 110 receives the second wireless signal 155. The first wireless communication device 110 processes the received second communication signal and, if necessary, transmits a first wireless signal 115 back to the second wireless communication device 150. In this manner, the first wireless communication device 110 and the second wireless communication device 150 exchange information ("communicate") with one another.

An Exemplary Wireless Communication Device

Figure 2:
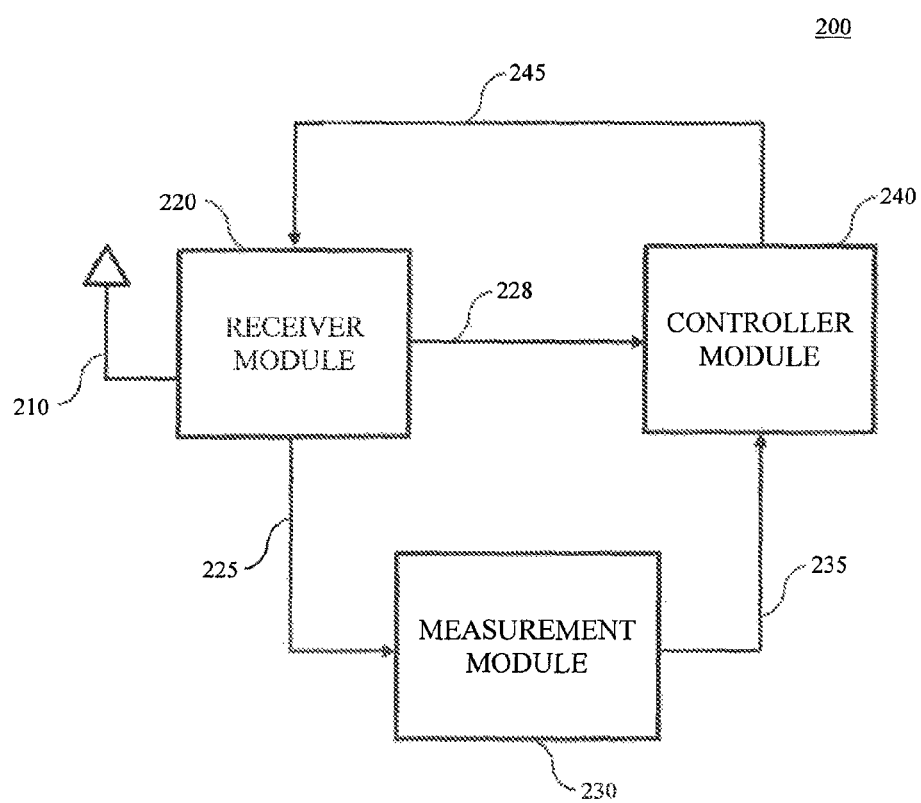
FIG. 2 illustrates a block diagram of a wireless communication device that is implemented as part of the wireless communication environment according to an exemplary embodiment of the invention.

FIG. 2 illustrates a block diagram of a wireless communication device 200 that is implemented as part of the wireless communication environment 100 according to an exemplary embodiment of the invention. The wireless communication device 200 includes a measurement module 230 and may represent an exemplary embodiment of the first wireless communication device 110.

The wireless communication device 200 includes an antenna element 210 for transmitting signals to, or receiving signals from, the wireless communication environment 100 using any acceptable modulation scheme. A receiver module 220 receives the received signals from the antenna element 210. The receiver module 220 may perform various front-end operations on the received signal, including demodulation, amplification and analog-to-digital conversion, as well as any other front-end operation within the spirit and scope of the present invention, in order to extract a usable data signal 228 contained within the received signal. After extracting the data signal 228, the receiver module 220 forwards the data signal 228 to a controller module 240 for further processing.

Signals received from the wireless communication environment 100 generally vary in power. For example, channel conditions, such as noise and interference, can significantly alter a signal passing through the wireless communication environment 100. Other external factors can also affect the power of a received signal, such as QAM that inherently includes a non-constant magnitude and the frame loading in OFDM signal frames. Consequently, simply processing the received signals may result in faulty signal processing or undesirable signal output. For example, high-power signals may experience clipping, whereas low-power signals may experience under-quantization. For these reasons, it is beneficial for the wireless communication device to attempt to normalize received signals to within a particular dynamic range. Therefore, the receiver module forwards the received signal 225 to the measurement module 230.

The receiver module preferably forwards the received signal 225 to the measurement module prior to demodulation or any subsequent processing on the signal. This allows the measurement module 230 to operate directly on the signal received from the wireless communication environment 100. In this manner the measurement module 230 is better able to determine the power of the received signal and make accurate calculations with respect thereto.

The measurement module 230 receives the received signal 225 from the receiver module 220. The measurement module 230 then analyzes the received signal 225, specifically examining a power, or various power characteristics, of the received signal 225. Based on the analysis of the received signal 225, the measurement module 230 calculates a gain. The measurement module 230 forwards the gain 235 to the controller module 240.

The controller module 240, using the received gain 235, generates a control signal 245 for controlling the receiver module 220 based on the gain. For example, the controller module 240 may generate an operation voltage for an analog amplifier within the receiver module 220, or may generate a set of parameters for a digital amplifier circuit within the receiver module 220, based on the gain 235.

Those skilled in the relevant art(s) will recognize that many alternative configurations may be available depending on application. For example, the measurement module 230 may be configured to generate the control signal, which it would then forward directly to the receiver module 220. In addition, the receiver module 220 could forward the received signal to the measurement module 230 after performing various processings on the signal, such as demodulation and/or analog-to-digital conversion. Additional modifications will also be available within the spirit and scope of the present invention.

An Exemplary Received Signal

FIG. 3A graphically illustrates a communication sub-frame 300 in accordance with a modulation scheme that may be implemented by the wireless communication device 110 according to an exemplary embodiment of the invention.

The communication sub-frame 300 has the typical configuration of an OFDM sub-frame that may be received by the wireless communication device 110 as the received signal. The communication sub-frame 300 is comprised of a plurality of resource blocks (RB) 310, arranged in a matrix. The communication sub-frame 300 shown in FIG. 3A includes N rows of resource blocks 310 and M columns of resource blocks, where M and N are each positive integers. The communication sub-frame 300 varies in frequency along its vertical axis and varies in time along its horizontal axis.

FIG. 3B graphically illustrates a resource block 310 that may be implemented within the communication sub-frame 300 according to an exemplary embodiment of the invention.

The resource block 310 includes a plurality of resource elements 314 arranged in a matrix. Each row of the matrix corresponds to a single orthogonal-frequency sub-carrier 316 and each column of the resource block 310 is a symbol 312. Information can be packaged into the resource block 310, or among multiple resource blocks 310, utilizing a plurality of resource elements 314 among one or more sub-carriers 316 and/or symbols 312.

Resource elements 314 may include a plurality of data resource elements 314a (shown in FIG. 3B as white squares). The data resource elements 314a can include information or may be left empty. The resource allocation for a mobile subscriber is in units of resource blocks. All the data resource elements in an allocated resource block are occupied. The resource elements 314 may also include a plurality of pilot resource elements 314b (shown in FIG. 3B as gray squares). The pilot resource elements 314b each include a pilot tone, which is used by a receiving device to measure certain characteristics relating to the channel, such as channel quality. The pilot tones are typically a simple sinusoidal signal with a predetermined frequency and amplitude.

Symbols may similarly be of different types. For example, pilot symbols (P) 312a are symbols that contain at least one pilot resource element 314b. The resource elements 314 within the pilot symbol that are not the pilot resource element 314b can be used as data resource elements 314a in order to maximize usable bandwidth. Conversely, data symbols (D) 312b are symbols that do not contain any pilot resource elements 314b.

The resource blocks 310 generally have a known symbol configuration. Thus, each resource block 310 may include a symbol arrangement of PDDDPDD, where P is a pilot symbol and D is a data symbol. Within each pilot symbol, however, the number and location of pilot tones may change depending on, for example, system parameters like cell ID, number of transmit ports at the BS, etc.

Those skilled in the relevant art(s) will recognize that many configurations are available for the communication sub-frame 300 and the resource blocks 310. For example, the resource blocks may include any symbol configuration and/or pilot locations, depending on application. Other configurations may also be available within the spirit and scope of the present invention.

An Exemplary Measurement Module

FIG. 4 illustrates a block diagram of a measurement module 400 that may be implemented as part of the wireless communication device 110 according to an exemplary embodiment of the invention. The measurement module 400 includes a pilot power estimation module 430 and may represent an exemplary embodiment of the measurement module 230.

As discussed above, the measurement module 400 receives the received signal from the receiver module 220. In the measurement module 400, the received signal is sent to both a pilot symbol power determination module 410 and a data symbol power determination module 420. The pilot symbol power determination module 410 calculates a power of a pilot symbol 312a (or an average power of more than one pilot symbol 312a) within a resource block 310. Because the arrangement of the symbols 312 within each resource block 310 is known, the pilot symbol power determination module 410 can easily locate the pilot symbols for use in the calculation. The pilot symbol power determination module 410 forwards the calculated pilot symbol power to the pilot power estimation module 430.

Similarly, the data symbol power determination module 420 calculates a power of a data symbol 312b (or an average power of more than one data symbol 312b) within the resource block 310. Because the arrangement of the symbols 312 within each resource block 310 is known, the data symbol power determination module 420 can easily locate the data symbols for use in the calculation. Preferably, the data symbol power determination module 420 selects at least one data symbol 312b immediately adjacent to the pilot symbols 312a selected by the pilot symbol power determination module 410 for use in the calculation of the data symbol power. The data symbol power determination module 420 forwards the calculated data symbol power to the pilot power estimation module 430.

The pilot power estimation module 430 receives the calculated pilot symbol power from the pilot symbol power determination module 410 and receives the data symbol power from the data symbol power determination module 420. The pilot power estimation module 430 then calculates an estimated pilot power according to the following equation:

$$P_{Pilot} = S_{Pilot} - \eta \cdot S_{Data}, \quad (1)$$

where $P_{Pilot}$ is the power of the pilot, $S_{Pilot}$ is the calculated pilot symbol power received from the pilot symbol power determination module 410, $S_{Data}$ is the calculated data symbol power received from the data symbol power determination module 420, and $\eta$ is a scaling factor based on various system parameters.

The scaling factor $\eta$ may be selected based on a plurality of system parameters, which are either known or are received from a device transmitting the received signal. For example, $\eta$ may be selected based on the number of pilot tones 314b within the pilot symbol 312a, a ratio of the pilot power to the data power (received from the transmitting device) and/or the number of antenna ports at the transmitting device. By scaling the data symbol power, the measurement module 400 can substantially subtract the power in the pilot symbol 312a attributable to the data resource elements 314a, leaving only the power attributable to the pilot resource elements 314b. From this, the pilot power estimation module 430 can easily estimate the pilot power.

The pilot power estimation module 430 then forwards the estimated pilot power to a gain module 440. The gain module 440 analyzes the estimated pilot power in order to set a gain for future received signals/signal frames. For example, a strong estimated pilot power typically evidences a clear channel, meaning that little or no gain is all that is necessary to place the signal within the desired dynamic range. Alternatively, a weak estimated pilot power typically evidences a noisy channel, which may require a large gain in order to place the received signals within the desired dynamic range. The gain module 440 forwards the calculated gain to the controller module 240 for generation of its control signals.

Preferably, the measurement module 400 operates on a subframe-by-subframe basis. In other words, the measurement module 400 should preferably analyze and calculate a gain for each subframe of the received signal. In this manner, the wireless communication device 110 can maintain proper gains at all times. However, in order to conserve power, the measurement module 400 may instead be configured to operate less frequently, or with a dynamic frequency based on the channel conditions. For example, the measurement module 400 can be configured to monitor the pilot powers estimated by the pilot power estimation module 430. When consecutive estimated pilot powers are all relatively close to one another, the measurement module 400 can reduce the frequency with which it analyzes received signals. Conversely, when consecutive estimated pilot powers differ substantially from each other, the measurement module 400 can increase the frequency with which it analyzes received signals. In this manner, the measurement module 400 can dynamically adapt to channel conditions in order to conserve power. Determining whether the estimated pilot powers are relatively close to one another, or whether they differ substantially from one another, can be determined by comparing differences between consecutive estimated pilot powers to a predetermined threshold or by comparing an estimated pilot powers to an acceptable range that is adjusted based on the previous estimated pilot powers.

With the above measurement module 400, the pilot power can be precisely computed even in the presence of interferers. Thus, gain can be accurately set to avoid saturation, which increases signal-to-quantization-noise ratio (SQNR) without incurring a higher bill of materials (BOM) in the analog-to-digital converter within the receiver module 220. In addition, because the measurement module 400 tracks only the changes in the channel (and not in the traffic), the gain changes will be smooth and will ease baseband processing.

Those skilled in the relevant art(s) will recognize that many other configurations may be implemented within the measurement module 400. For example, $\eta$ may be based on several additional system parameters or fewer system parameters than those listed above. Further configurations may be available depending on application, within the spirit and scope of the present invention.

An Exemplary Method of Adjusting the Gain of a Received Signal

FIG. 5 illustrates a block diagram of a method for adjusting the gain of a received wireless signal in a wireless communication device according to an exemplary embodiment of the invention.

The method begins at step 510 and immediately proceeds to step 520. As discussed above, the received signal may be a communication sub-frame comprised of a plurality of resource blocks. Each of the resource blocks includes a plurality of symbols, including pilot symbols that contain at least one pilot tone and data symbols that do not contain any pilot tones. In step 520, a power of a pilot symbol (or an average of more than one pilot symbol) is determined. The method then proceeds to step 530.

In step 530, a power of a data symbol (or an average of more than one data symbol) is determined. The data symbol is preferably immediately adjacent to the pilot symbol within a resource block of the communication sub-frame. The method then proceeds to step 540. In step 540, a pilot power is estimated based on the pilot symbol power and data symbol power. For example, the pilot power can be estimated according to equation (1), above. The method then proceeds to step 550.

In step 550, a gain of the received signal is adjusted based on the estimated pilot power. For example, if the pilot has a high power, the gain is adjusted to be low. Conversely, if the pilot has a low power, the gain is adjusted to be high so as to amplify the received signal to be within a preferred dynamic range. The method then proceeds to step 560, where the method ends.

Those skilled in the relevant art(s) will recognize that the method can additionally or alternatively include any of the functionality of the wireless communication device 110 discussed above, and the above description of the exemplary method should neither be construed to limit the method nor the description of the wireless communication device 110.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A wireless communication device, comprising:
   a receiver module configured to receive a signal;
   a measurement module configured to estimate a pilot power of a pilot tone within the received signal by:
      measuring a pilot symbol power of a selected pilot symbol that includes the pilot tone;
      measuring a data symbol power of a selected data symbol within the received signal;
      scaling the data symbol power based on a number of pilot tones within the selected pilot symbol; and
      determining the pilot power based on the scaled data symbol power; and
   a gain module configured to determine a gain based on the pilot power.

2. The wireless communication device of claim 1, wherein the receiver module amplifies the received signal based on the determined gain.

3. The wireless communication device of claim 1, wherein the received signal includes a plurality of symbols that each includes a plurality of resource elements, the plurality of symbols including the selected pilot symbol and the selected data symbol, and
   wherein the selected pilot symbol has at least one resource element occupied with the pilot tone, and the selected data symbol has no resource elements occupied with any pilot tone.

4. The wireless communication device of claim 3, further comprising:
   a pilot symbol power determination module configured to determine the pilot symbol power of the selected pilot symbol; and
   a data symbol power determination module configured to determine the data symbol power of the selected data symbol,
   wherein the measurement module estimates the pilot power based on the pilot symbol power and the data symbol power.

5. The wireless communication device of claim 3, further comprising:
   a pilot symbol power determination module configured to determine the pilot symbol power as an average power of more than one pilot symbol that includes the selected pilot symbol; and
   a data symbol power determination module configured to determine the data symbol power as an average power of more than one data symbol that includes the selected data symbol,
   wherein the measurement module estimates the pilot power based on the pilot symbol power and the data symbol power.

6. The wireless communication device of claim 4, wherein the measurement module estimates the pilot power according to the following equation, $$P_{Pilot} = S_{Pilot} - \eta S_{data},$$

where $P_{Pilot}$ is the estimated pilot power, $S_{Pilot}$ is the pilot symbol power, $S_{data}$ is the data symbol power, and $\eta$ is a scaling factor based on one or more system parameters.

7. The wireless communication device of claim 4, wherein the selected data symbol is located immediately adjacent to the selected pilot symbol within the received signal.

8. The wireless communication device of claim 1, wherein the received signal includes a plurality of subframes, and wherein the gain module determines the gain for each subframe of the received signal.

9. The wireless communication device of claim 1, wherein the received signal includes a plurality of subframes, and
   wherein the gain module determines the gain for a subset of the plurality of subframes.

10. A method for adjusting a gain of a received signal in a wireless communication device, comprising:
    estimating a pilot power of a pilot tone within the received signal, the estimating including:
       measuring a pilot symbol power of a selected pilot symbol that includes the pilot tone;
       measuring a data symbol power of a selected data symbol within the received signal;
       scaling the data symbol power based on a number of pilot tones within the selected pilot symbol; and
       determining the pilot power based on the scaled data symbol power; and
    determining the gain based on the pilot power.

11. The method of claim 10, further comprising amplifying the received signal based on the determined gain.

12. The method of claim 10, wherein the received signal includes a plurality of symbols that each includes a plurality of resource elements, the plurality of symbols including the selected pilot symbol and the selected data symbol, and
    wherein the selected pilot symbol has at least one resource element occupied with the pilot tone, and the selected data symbol has no resource elements occupied with any pilot tone.

13. The method of claim 12, wherein the data symbol power is scaled based on a ratio of a number of data resource elements included in the selected pilot symbol to a total number of resource elements included in the selected pilot symbol.

14. The method of claim 13, wherein the pilot power is estimated by comparing the measured pilot symbol power to the scaled data symbol power.

15. The method of claim 13, wherein the pilot power is estimated according to the following equation, $$P_{Pilot} = S_{Pilot} - \eta S_{data},$$

where $P_{Pilot}$ is the estimated pilot power, $S_{Pilot}$ is the pilot symbol power, $S_{data}$ is the data symbol power, and $\eta$ is a scaling factor based on one or more system parameters.

16. The method of claim 13, wherein the selected data symbol is located immediately adjacent to the selected pilot symbol.

17. The method of claim 10, wherein the received signal includes a plurality of subframes, and
    wherein the gain is determined for each subframe of the received signal.

18. The method of claim 10, wherein the received signal includes a plurality of subframes, and
    wherein the gain is determined for every nth subframe, where n is a positive integer that increases and decreases with channel characteristics.

19. A non-transitory computer-readable storage medium storing a program, which when executed by a computer, causes the computer to function as:
    a measurement module configured to estimate a pilot power of a pilot tone within a received signal by:
       measuring a pilot symbol power of a selected pilot symbol that includes the pilot tone;
       measuring a data symbol power of a selected data symbol within the received signal;
       scaling the data symbol power based on a number of pilot tones within the selected pilot symbol; and determining the pilot power based on the scaled data symbol power; and a gain module configured to determine a gain based on the pilot power.

20. The non-transitory computer-readable storage medium of claim 19, further comprising:

a pilot symbol power determination module configured to determine the pilot symbol power; and a data symbol power determination module configured to determine the data symbol power, wherein the received signal includes a plurality of symbols that each includes a plurality of resource elements, the plurality of symbols including the selected pilot symbol and the selected data symbol, and wherein the selected pilot symbol has at least one resource element occupied with the pilot tone, and the selected data symbol has no resource elements occupied with any pilot tone.

21. A wireless communication device, comprising:

a receiver module configured to receive a signal;

a measurement module configured to estimate a pilot power of a pilot tone within the received signal by
measuring a pilot symbol power of a selected pilot symbol that includes the pilot tone;
measuring a data symbol power of a selected data symbol within the received signal; and
scaling the data symbol power;

a gain module configured to determine a gain based on the pilot power;

a pilot symbol power determination module configured to determine the pilot symbol power as an average power of more than one pilot symbol that includes the selected pilot symbol; and a data symbol power determination module configured to determine the data symbol power as an average power of more than one data symbol that includes the selected data symbol, wherein the received signal includes a plurality of symbols that each includes a plurality of resource elements, the plurality of symbols including the selected pilot symbol and the selected data symbol, wherein the selected pilot symbol has at least one resource element occupied with the pilot tone, and the selected data symbol has no resource elements occupied with any pilot tone, and wherein the measurement module estimates the pilot power based on the pilot symbol power and the data symbol power.

22. A method for adjusting a gain of a received signal in a wireless communication device, comprising:

estimating a pilot power of a pilot tone within the received signal, the estimating including:
measuring a pilot symbol power of a selected pilot symbol that includes the pilot tone;
measuring a data symbol power of a selected data symbol within the received signal; and
scaling the data symbol power; and determining the gain based on the pilot power;

amplifying the received signal based on the determined gain, wherein the received signal includes a plurality of symbols that each includes a plurality of resource elements, the plurality of symbols including the selected pilot symbol and the selected data symbol, wherein the selected pilot symbol has at least one resource element occupied with the pilot tone, and the selected data symbol has no resource elements occupied with any pilot tone, and wherein the data symbol power is scaled based on a ratio of a number of data resource elements included in the selected pilot symbol to a total number of resource elements included in the selected pilot symbol.

* * * * *

UNITED STATES PATENT AND TRADEMARK OFFICE
CERTIFICATE OF CORRECTION

PATENT NO. : 8,855,250 B2  
APPLICATION NO. : 13/252047  
DATED : October 7, 2014  
INVENTOR(S) : Alex et al.

Page 1 of 1

It is certified that error appears in the above-identified patent and that said Letters Patent is hereby corrected as shown below:

In the Claims,

Column 11, line 22, please replace "by" with --by:--.

Signed and Sealed this  
Seventeenth Day of February, 2015

Michelle K. Lee  
*Deputy Director of the United States Patent and Trademark Office*